US009970189B2

(12) United States Patent
Szymberski

(10) Patent No.: US 9,970,189 B2
(45) Date of Patent: May 15, 2018

(54) TENSION COMPRESSION STRUCTURAL UNIT AND METHOD OF ASSEMBLING THE SAME

(71) Applicant: Christopher Szymberski, Milton, WI (US)

(72) Inventor: Christopher Szymberski, Milton, WI (US)

( * ) Notice: Subject to any disclaimer, the term of this patent is extended or adjusted under 35 U.S.C. 154(b) by 0 days. days.

(21) Appl. No.: 15/252,797

(22) Filed: Aug. 31, 2016

(65) Prior Publication Data

US 2018/0058059 A1    Mar. 1, 2018

(51) Int. Cl.
*E04B 1/19*    (2006.01)
*G09B 23/04*    (2006.01)

(52) U.S. Cl.
CPC ............... *E04B 1/19* (2013.01); *G09B 23/04* (2013.01); *E04B 2001/1924* (2013.01); *E04B 2001/1996* (2013.01)

(58) Field of Classification Search
CPC .. E04B 1/19; E04B 1/3211; E04B 2001/1927; E04B 2001/1978; E04B 2001/1975; E04B 2001/1996; E04B 2001/1924; G09B 23/04
USPC ................... 52/645, 646, 641, DIG. 10, 108
See application file for complete search history.

(56) References Cited

U.S. PATENT DOCUMENTS

| | | | | | |
|---|---|---|---|---|---|
| 417,678 | A | * | 12/1889 | MacLaurin | E04B 1/19 52/646 |
| 3,063,521 | A | * | 11/1962 | Fuller | E04B 1/19 428/542.2 |
| 3,695,617 | A | * | 10/1972 | Mogilner | A63F 9/0876 273/156 |
| 3,866,366 | A | * | 2/1975 | Fuller | E04B 1/19 482/36 |
| 3,889,950 | A | * | 6/1975 | Kasravi | A63H 33/18 190/1 |
| 3,977,683 | A | * | 8/1976 | Tomura | A63F 9/088 273/155 |
| 4,107,870 | A | * | 8/1978 | Ausnit | A63H 33/06 24/589.1 |
| 4,182,086 | A | * | 1/1980 | Crooks | E04L 31/3211 52/309.4 |

(Continued)

FOREIGN PATENT DOCUMENTS

| | | | | | |
|---|---|---|---|---|---|
| GB | 1564111 | A | * | 4/1980 | ............... E04B 1/32 |
| GB | 1564112 | A | * | 4/1980 | ............... E04B 1/19 |
| GB | 1564113 | A | * | 4/1980 | ............... E04B 1/19 |

*Primary Examiner* — Joshua J Michener
*Assistant Examiner* — Matthew J Gitlin
(74) *Attorney, Agent, or Firm* — Williams Intellectual Property; Benjamin F. Williams

(57) ABSTRACT

A tension compression structural unit and method of assembling structures that comprises endwise interlapping configuration of at least three elongate members into a tension compression structural unit whereby tensegrity is maintained by tensioning a first end of each elongate member against respective first ends of each other elongate member, in interlapped array, and then anchoring each second end of each elongate member—either onto a ground surface or by interlapped configuration with additional elongate members. A stable, domic structure is thus erectable without the need of additional tensioning elements such as wires or cables, for example.

5 Claims, 17 Drawing Sheets

(56) References Cited

U.S. PATENT DOCUMENTS

| | | | | |
|---|---|---|---|---|
| 4,731,962 A * | 3/1988 | Kittner | ............... | A63H 33/103 |
| | | | | 135/121 |
| 5,069,009 A * | 12/1991 | Suzuki | ............... | E04B 1/3211 |
| | | | | 52/660 |
| 5,448,867 A * | 9/1995 | Wilson | ................ | A01G 9/16 |
| | | | | 52/641 |
| 5,857,294 A | 1/1999 | Castro | | |
| 6,192,644 B1 * | 2/2001 | Kunieda | ............... | E04B 1/19 |
| | | | | 29/897.31 |
| 6,542,132 B2 * | 4/2003 | Stern | ................. | H01Q 15/161 |
| | | | | 343/880 |
| 6,672,789 B2 | 1/2004 | Chen | | |
| 7,100,333 B2 * | 9/2006 | Hoberman | ......... | E04L 31/3211 |
| | | | | 135/29 |
| 7,278,245 B2 | 10/2007 | Rouse | | |
| 7,452,578 B2 | 11/2008 | Lanahan | | |
| 7,694,463 B2 * | 4/2010 | Lanahan | ............... | E04L 31/19 |
| | | | | 446/118 |
| 7,900,405 B1 * | 3/2011 | Jacoby | ............... | E04L 37/105 |
| | | | | 210/163 |
| 2014/0130424 A1 * | 5/2014 | Betts | ..................... | A01K 1/00 |
| | | | | 52/81.3 |

* cited by examiner

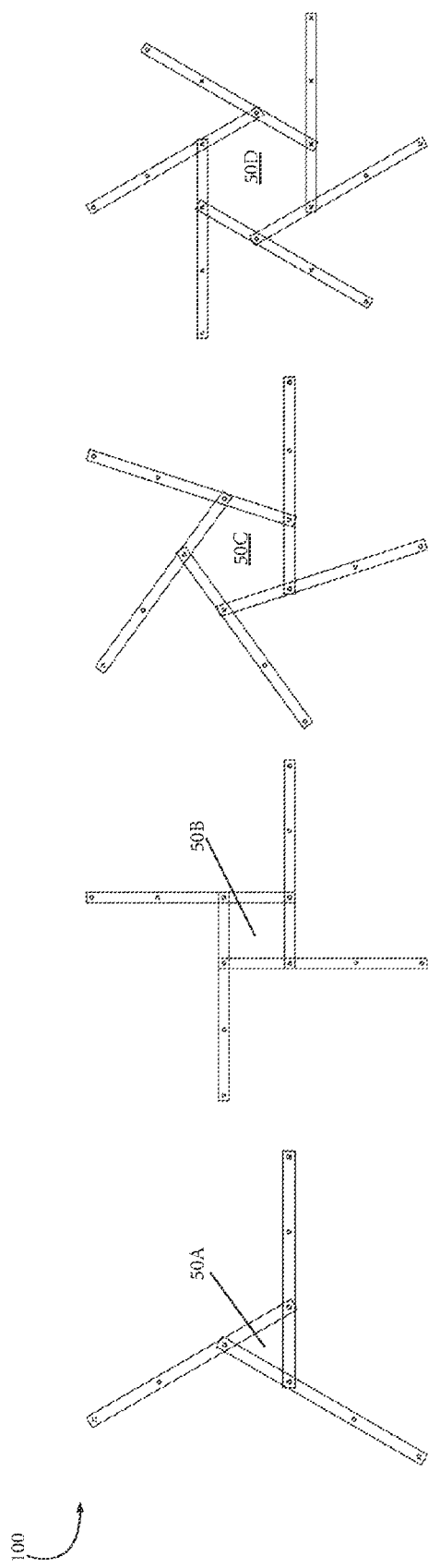

TENSION COMPRESSION STRUCTURAL UNIT AND METHOD OF ASSEMBLING THE SAME

BACKGROUND OF THE INVENTION

Structures creatable by tensile-integrity structures were first contemplated by R. B. Fuller in the 1950s and 1960s (see for example U.S. Pat. No. 3,063,521). Fuller teaches "tensegrity" structures additional together into an overarching generally spherical or domic array. Tension is maintained throughout his structure by use of "tension elements" including, for example, "wires or cables".

Likewise, means of devising three-dimensional representations of polygons is known in the art, such as is taught by Chen (U.S. Pat. No. 6,672,789), however, these structures are typically employed for demonstration only, and lack any sufficiency for load bearing. In the case of the device taught by Chen, as with others, interconnection of supporting rods is enabled by endwise mating into a spherical connector which orients the rods into pyramidal and other polygonal arrangements.

Applicant's invention, however, enables erection of a tension compression, tension integrity ("tensegrity") structural unit wherein each of at least three elongate members is disposed in interlapping array to apply tension forces against each other and maintain integrity. No additional tensioning elements (such as wires or cables) are required; the elongate members are flexible and elastic enough to tension against each other, and thus define curved boundaries delimiting a central aperture between their interlapped ends.

This central aperture defines an "attractor polygon", that is a polygon dependent on the number of elongate members comprising the particular structural unit comprehended by application of the method set forth herein. Thus three elongate members create a triangular attractor polygon; four, a square attractor polygon; five, a pentagonal attractor polygon; and so on. Interconnection of such structural units thus creates a mode of attractor polygons by which domic and large, load bearing structures are creatable by interlapping configuration of a plurality of elongate members. No additional tensioning elements are necessarily required. The attractor polygons may be regular, comprising equal length sides and equal angles, or irregular, comprising unequal length sides and/or unequal angles.

The invention set forth herein thus renders a useful improvement over the teaching of R. B. Fuller, enabling erection of large spanning structures with a repeating single element. Moreover, variances in this repeating element— such as length of the elongate member, position of each of a first and a second seat endwise disposed upon said elongate member, or position of each of a corresponding first and second interconnection member upon said elongate member, for example, enable various iterations and combinations of structural units, whereby attractor polygons formed at one vertex of the structure transition into a secondary attractor polygon which secondary attractor polygon may likewise transition back to an attractor polygon or into a tertiary attractor polygon, whereby regular and irregular polyhedrons are creatable in almost innumerable compositions adaptable for structural assembly according to the dictates of the inventive step contemplated herein.

FIELD OF THE INVENTION

The present invention relates to a tension compression structural unit and method of assembling structures by interaction of tensioned elements disposed in interlapping configuration whereby tension integrity is maintainable and large, spanning structures with an open understory are creatable by repeating interlapping configuration of identical or alike elongate members.

Tension integrity is enabled by use of flexible elongate members individually capable of exerting tension when configured in endwise interlapped array whereby each of the elongate members exerts an elastic force tensioned against a neighboring and interlapped elongate member. Thus, creation of tension integrity is enabled at structural units formable by endwise interlapped configuration of at least three elongate members into innumerable large, spanning, domic and polyhedral structures, formable without the need of additional tensioning elements, such as wires or cables, or specific supporting structures disposed interior to the understory.

SUMMARY OF THE INVENTION

The present tension compression structural unit is comprehended to engender stable polyhedral and domic structures of various sizes, suited for human habitation as well as for other purposes wherein erection of a spanning structure in desirable. The present tension compression structural unit is erectable as a self-supporting structure independent of scale, and is therefore usable at small scales (for example as children's toys and erection sets as well as for furnishings, such as chandeliers, for example) as in addition to large, self-supporting load bearing structures usable as coverings and habitations. The present tension compression structural unit positions at least three elongate members bowed in interlapped endwise configuration, whereby elastic forces of said elongate members compress and tension against each other in stable array. Anchoring of each other end of each of said a least three elongate members enables stability of an arced structure comprising bowed elongate members maintaining tension integrity against each other, at each interlapped end. Anchoring of each other end of each of said at least three elongate members into additional interlapped configuration with additional elongate members enables increased size and complexity of the associated structure erectable by employing the principles and comprehensions herein set forth, as will be described subsequently below.

Interlap of at least three elongate members enables tension and compression of each elongate member in endwise interlapped configuration. The term "interlap", and its derivative forms as used herein throughout, is taken to mean the overlapping and underlapping configuration of each end of each elongate member relative at least two other neighboring elongate members, whereby an associated end of each elongate member is disposed overlapping at least one other elongate member and underlapping at least another elongate member into a tensioned engagement.

At least three elongate members in interlapped configuration is required to maintain tensegrity. Three elongate members interlapped at each respective first end delimit a triangular polygon (triangle). An attractor polygon (in the case of three elongate members interlapped together, a triangle) is thereby formative of the repeating structural unit replicated in like interlapped configuration at each of the three elongate member second ends. An icosahedron is thus formable having 20 triangular faces (said faces actually empty space between the elongate member interlapped ends), 30 edges (marked in curved lines along the length of each elongate member bowed in tension and compression) and 12 axes. An icosidodecahedron is likewise formable, for example, with triangular attractor polygons delimited at each end of each interlapped configuration of elongate members, and pentagonal secondary polygons formed by the length of each of five elongate members disposed in perimetric relationship around said pentagonal secondary attractor polygon.

Innumerable polyhedrons are formable by employment of the present method, whereby interlappping configuration of structural units devised of at least three interlapped elongate members maintains tensegrity throughout the entire structure. Domic structures are readily creatable by anchoring lowermost ends of elongate members to a ground surface or foundation to maintain tension along such elongate members endwise projected into said ground surface.

Thus has been broadly outlined the more important features of the present tension compression structural unit and method of assembling structures so that the detailed description thereof that follows may be better understood and in order that the present contribution to the art may be better appreciated.

Objects of the present tension compression structural unit and method of assembling structures, along with various novel features that characterize the invention are particularly pointed out in the claims forming a part of this disclosure. For better understanding of the tension compression structural unit and method of assembling structures, its operating advantages and specific objects attained by its uses, refer to the accompanying drawings and description.

BRIEF DESCRIPTION OF THE DRAWINGS

Figures

FIG. 15A through 15C illustrates a plurality of example embodiments of structural units creatable by interlapped configuration between first end of pluralities of elongate members.

DETAILED DESCRIPTION OF THE DRAWINGS

Figure 1:
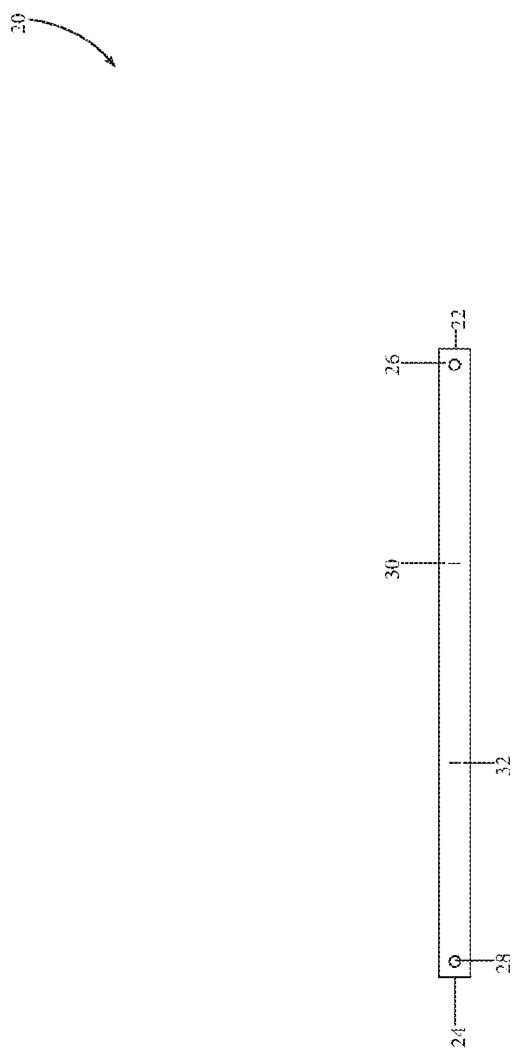
FIG. 1 is an top view of an example embodiment of an elongate member.
Figure 2:
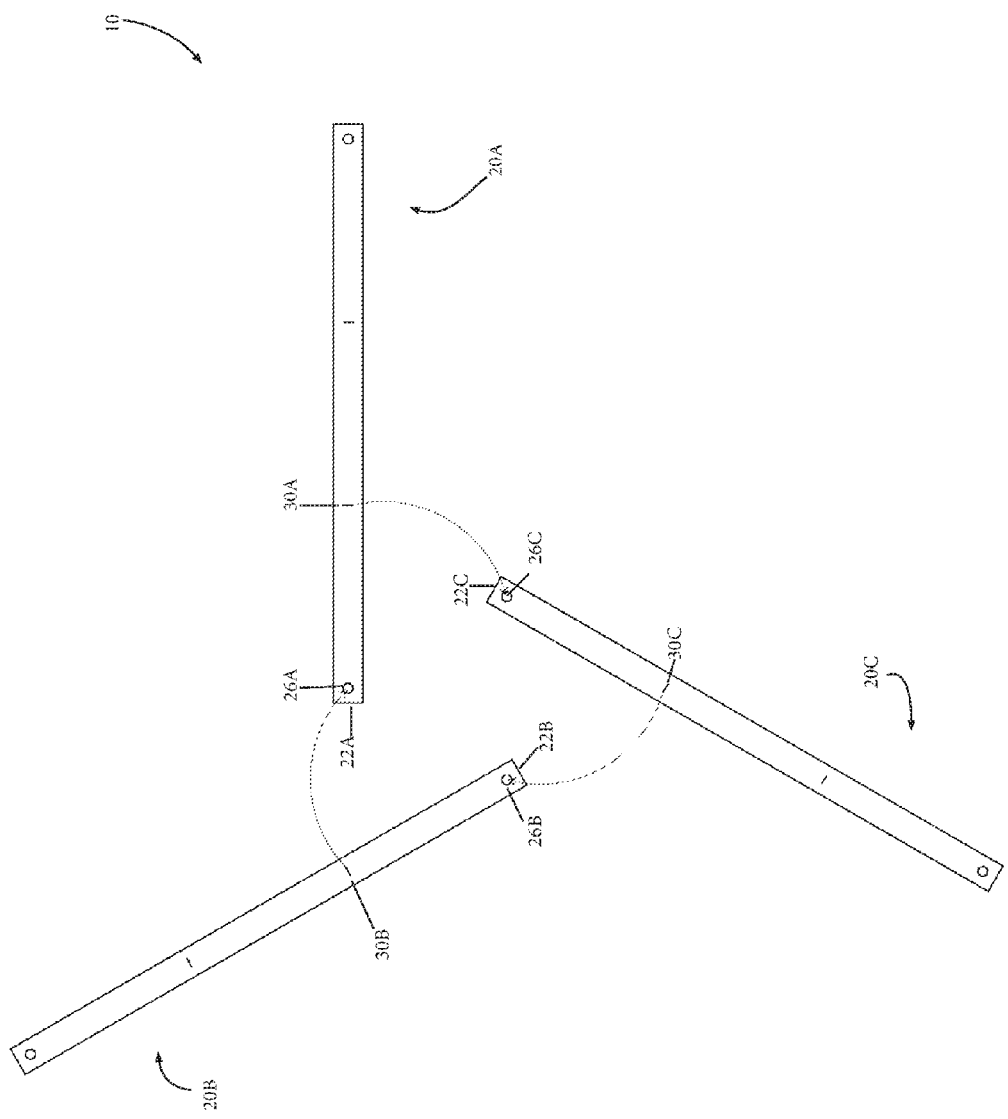
FIG. 2 is a top view of an example embodiment of three elongate members prepared for interlapped configuration of each of said three elongate members first ends.
Figure 3:
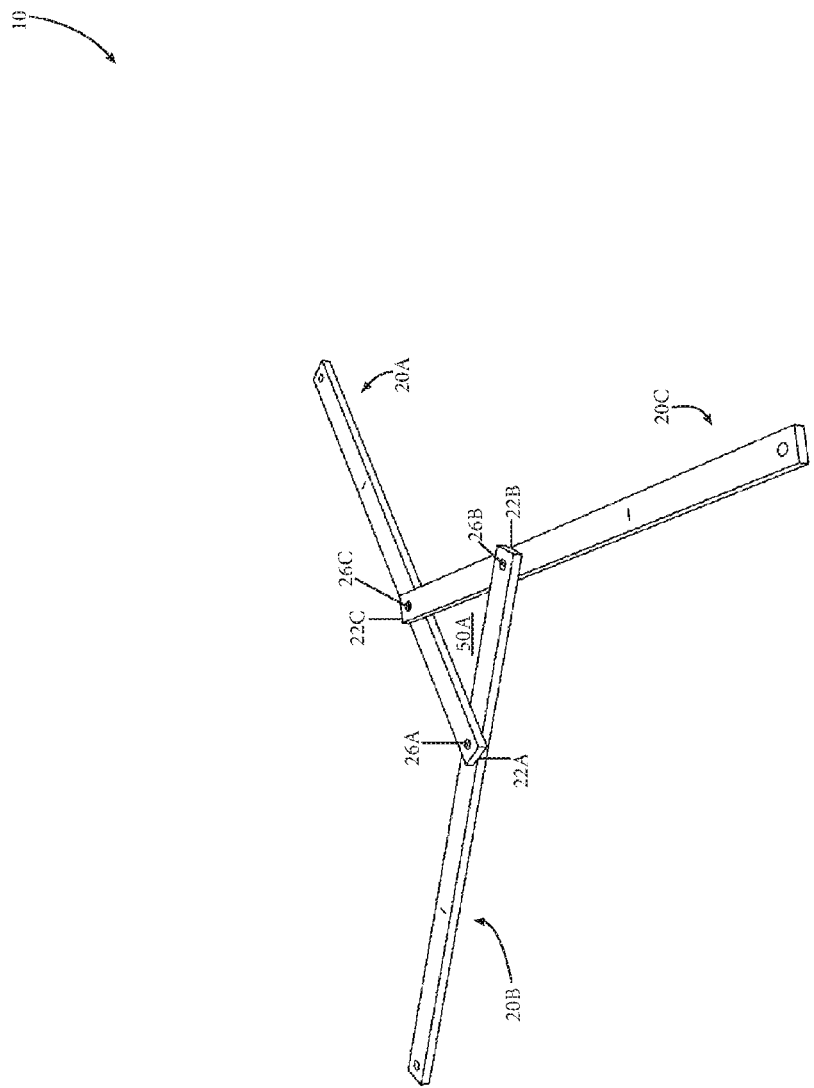
FIG. 3 is a plan elevation view of an example embodiment of three elongate members in interlapped configuration at each of the elongate member's first ends to form an triangular attractor polygon delimited between each of the elongate member's first ends.

With reference now to the drawings, and in particular FIGS. 1 through 15 thereof, example of the instant tension compression structural unit and method of assembling structures employing the principles and concepts of the present tension compression structural unit and method of assembling structures and generally designated by the reference number 10 will be described.

Referring to FIGS. 1 through 15 example embodiments of the present tension compression structural unit and method of assembling structures 10 is illustrated. The present tension compression structural unit and method of assembling structures 10 has been devised to enable erection of structures by interlapping configuration of a plurality of elongate members 20. Each of the plurality of elongate members 20 is substantially similar. While minor differences are understandable between species of said plurality of elongate member 20, such as differences in length of a particular elongate member 20, or position of medial interconnection members 30, 32 and seats 26, 28 (as will be described subsequently) relative those of neighboring elongate members, whereby innumerable structures are creatable, it should be recognizable to anyone having ordinary skill in the art that the present invention 10 is readily apprehended by discussion of like elongate members 20, the general principles of use and erection of associated structures independent on such minor differences as previously described. Changes in length of the elongate members and position of associated interconnection members and seats enables creation of more complex structures, however the principle of tension compression to maintain integrity of any such structure is constant between embodiments. Discussion then of regular tetrahedral structures creatable by employment of the present invention is deemed most expedient for disclosure, as will be appreciated by one having ordinary skill in the art.

The present tension and compression structural unit and method of assembling structures 10, then, includes a plurality of elongate members 20. Each of the plurality of elongate members 20 is substantially similar the example embodiment illustrated in FIG. 1. Each elongate member 20, then, includes a first end 22 and a second end 24. A first seat 26 is disposed at the first end 22 and a second seat 28 is disposed at the second end 24. A first medial interconnection member 30 is disposed more proximal the first end 22 and a second medial interconnection member 32 is disposed more proximal the second end 24. Each elongate member 20 is flexible and elastic enough to curve and enable endwise interconnection with neighboring elongate members 20, as will be described subsequently, while exerting an elastic force resistant of deformation.

The method of structural assembly of a simplest tensegrity structure is illustrated in FIGS. 2-6. Interlap of first ends 22A, 22B, and 22C, of elongate members 20A, 20B, and 20C, connects a first seat 26A of a first elongate member 20A to the first medial interconnection member 30B of a second elongate member 20B, said second elongate member 20B connected at said second elongate member's 20B first seat 26B to the first medial interconnection member 30C of a third elongate member 20C, which third elongate member's 20C first seat 26C is likewise connected at the first elongate member's 20A medial interconnection member 30A (see FIG. 2). The first elongate member 20A first end 22A is disposed atop the second elongate member 20B first end 20B, and the second elongate member 20B is disposed atop the third elongate member 20C first end 20C, which third elongate member 20C is disposed atop the first elongate member 20A first end 22A. Thus each first end 22A, 22B, and 22C, of each of said first 20A, second 20B, and third 20C elongate members is disposed in interlapping array whereby tension and compression is applicable at an attractor polygon 50A formable between each of the interlapping ends 22A, 22B, 22C.

Figure 4:
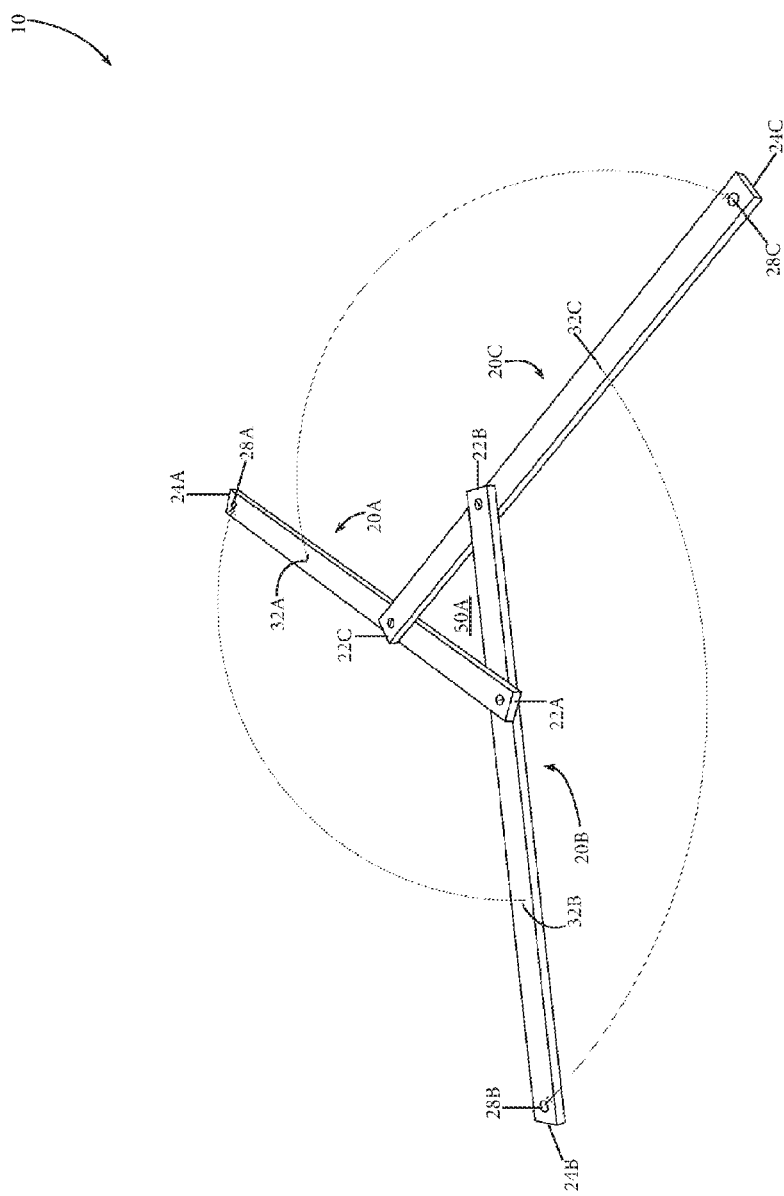
FIG. 4 is a plan elevation view of an example embodiment of the three elongate members prepared for interlapped configuration of each of said three elongate member's second ends.
Figure 5:
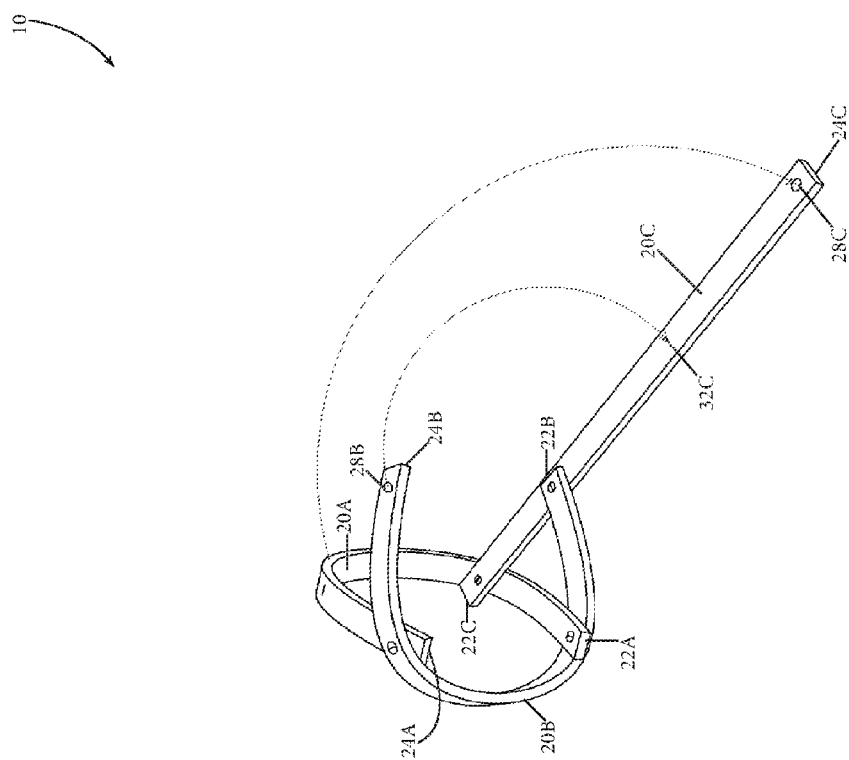
FIG. 5 is a plan elevation view of an example embodiment of the three elongate members having two of said three elongate member's second ends interlapped.
Figure 6:
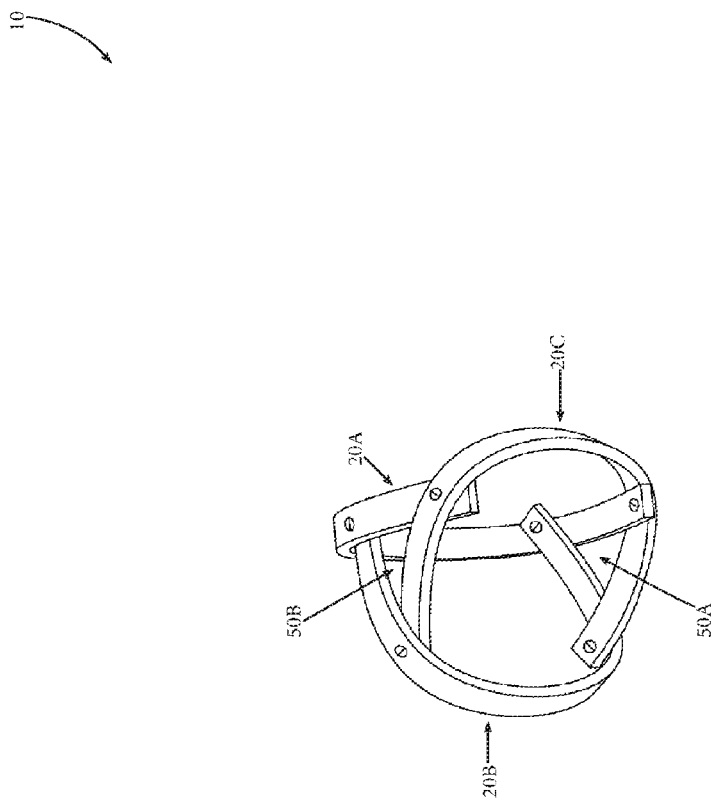
FIG. 6 is a plan elevation view of an example embodiment of the simplest form of tensegrity structure producible by the present method, wherein the attractor polygons formed are triangles. The structure maintains integrity.

FIGS. 4 through 6 illustrate creation of a simplest tensegrity structure formable with just three elongate members 20A, 20B, and 20C, tensioned against each other in endwise interlapped configuration. This illustration is provided as example only, and illustrates the most primitive self-supporting structure creatable by employment of the present invention 10. After the first ends 22A, 22B, and 22C of the elongate members 20A, 20B, and 20C, are appropriately interlapped, second ends 24A, 24B, 24C are thence likewise interlapped together around a second, and opposing attractor polygon 50B. This simplest structure formed is self-supporting and maintains integrity by compression tension forces transmitted through each elongate member 20A, 20B, 20C, first ends 22A, 22B, 22C, and each elongate member 20A, 20B, 20C, second ends 24A, 24C, and 24B.

Figure 7:
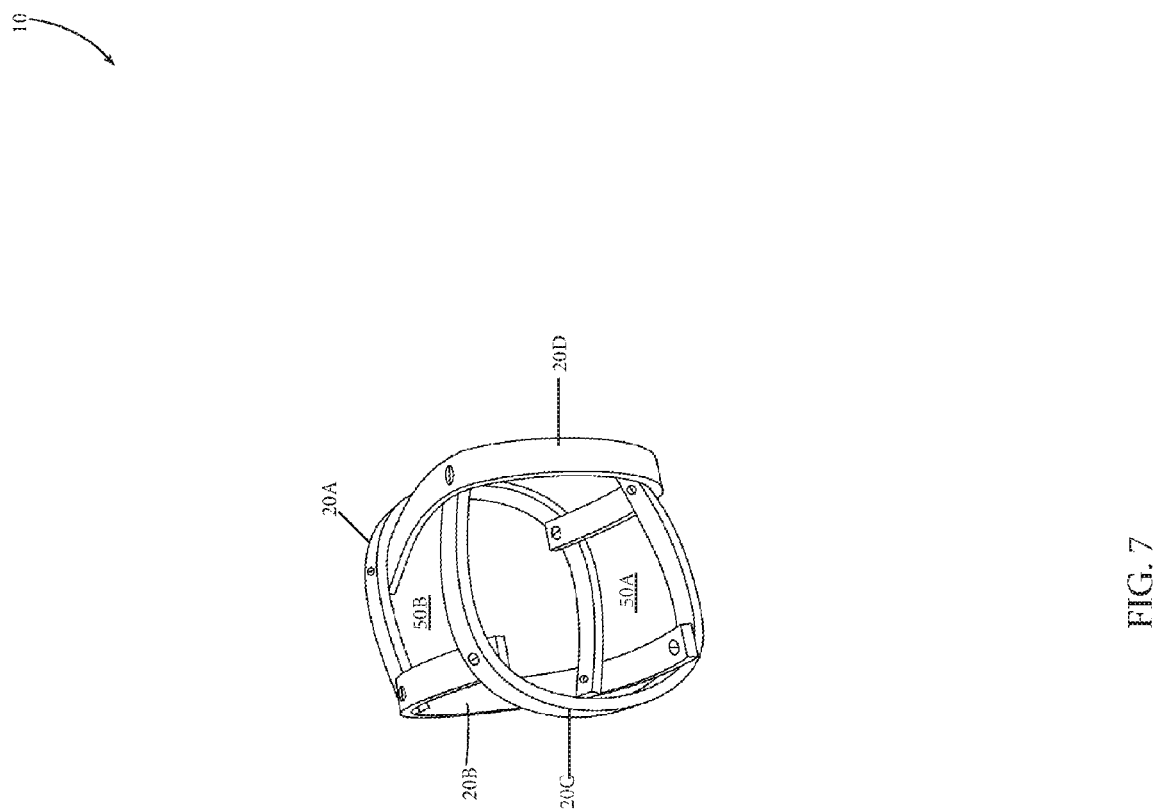
FIG. 7 is a plan elevation view of an example embodiment of a simplest form of a tensegrity structure producible using four elongate members, whereby the attractor polygon is a square.
Figure 8:
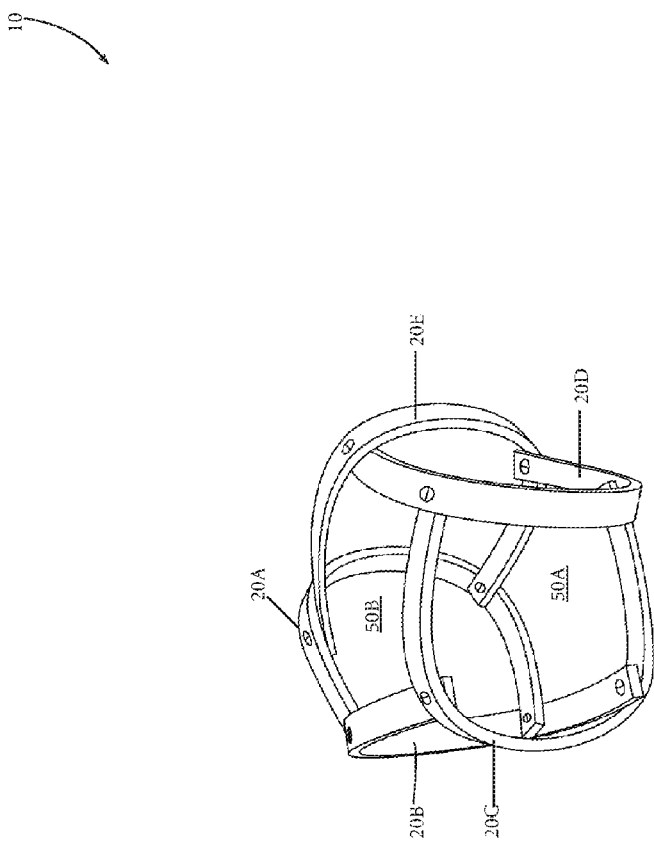
FIG. 8 is a plan elevation view of an example embodiment of a simplest form of a tensegrity structure producible using five elongate members, whereby the attractor polygon is a pentagon.

FIG. 7 illustrates the simplest self-supporting structure creatable with four elongate members 20A, 20B, 20C, and 20D, interlapped together around opposing square attractor polygons, 50A and 50B. FIG. 8 likewise illustrates the simplest self-supporting structure creatable with five elongate members 20A. 20B, 20C, 20D, and 20E, whereby opposing pentagonal attractor polygons 50A and 50B are formable. It should be obvious to anyone of ordinary skill that the instant examples are illustrative only, and innumerable versions are thus creatable by increasing the number of elongate members 20 into interlapped configuration, and, also, by altering the configuration of interlapped ends between groups of elongate members, as will be exemplified subsequently.

Figure 15B:
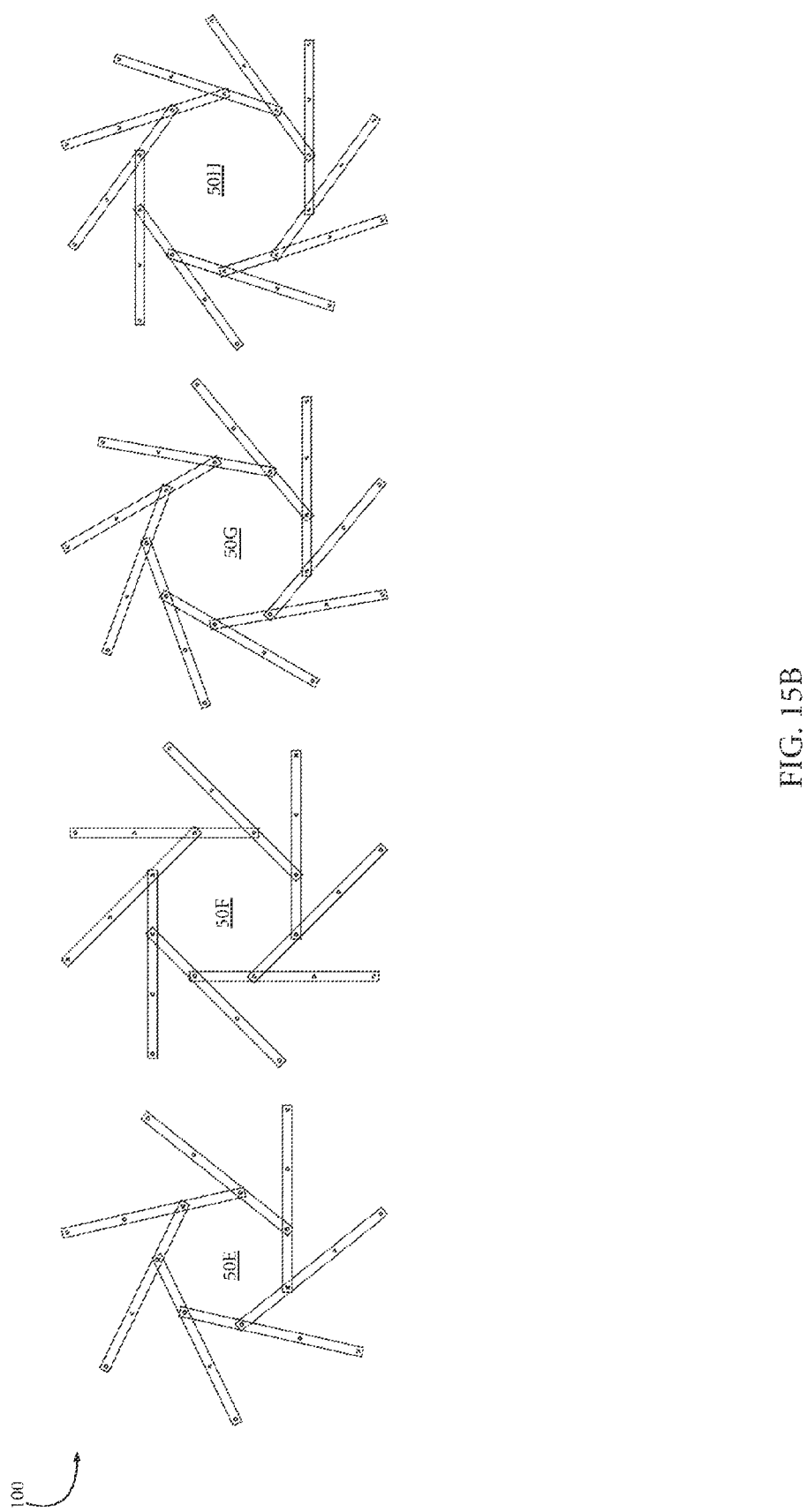

FIG. 15A and FIG. 15B illustrate example embodiments of base structural units 100 formable by interlapped first ends of pluralities of elongate members, each of which configurations forms initial base structural units 100 for interconnection with additional pluralities of elongate members. Each of the base structural units 100 depicted is usable to create unique, self-supporting domic structures capable of maintaining a span.

FIG. 15A thus illustrates four species of base structural units 100, identifiable by an attractor polygon 50 disposed delimiting a central aperture formed by the interlapped configuration of elongate member 20 first ends 22. Thus, with reference to FIG. 15A, a base structural unit 100 of three elongate members forms a triangular attractor polygon 50A, a base structural unit 100 of four elongate members forms a square attractor polygon 50B, a base structural unit 100 of five elongate members forms a pentagonal attractor polygon 50C, whereby a base structural unit 100 of n elongate members (not shown) forms an n-sided attractor polygon.

The base structural units 100 may be employed in repeating iterations of like units, and interconnected together, or may be used in multiple combinations, constrained only by necessary geometric relationships definitive of attractor polygons formable between the elongate members. The base structural units 100 illustrated in FIGS. 15A and 15B vary only by addition of an elongate member to effectively increase the attractor polygon 50 by one side. As described above, FIG. 15A illustrates interlapped configuration of elongate members forming regular attractor polygons, including a triangular attractor polygon 50A, a square attractor polygon 50B, a pentagonal attractor polygon 50C, and a hexagonal attractor polygon 50D.

FIG. 15B illustrates additional base structural units 100 formable with additions of elongate members 20 into the base structural unit 100 wherein the number of sides of the attractor polygon 50 increases in proportion to the number of elongate members 20 comprising the base structural unit 100. FIG. 15B continues the series begun in FIG. 15 A, adding an elongate member in each iteration, and thereby increasing the number of sides of each regular attractor polygon of each base structural unit 100, including a heptagonal attractor polygon 50E, an octagonal attractor polygon 50F, a nonagonal attractor polygon 50G, and a decagonal attractor polygon 50H.

Figure 15C:
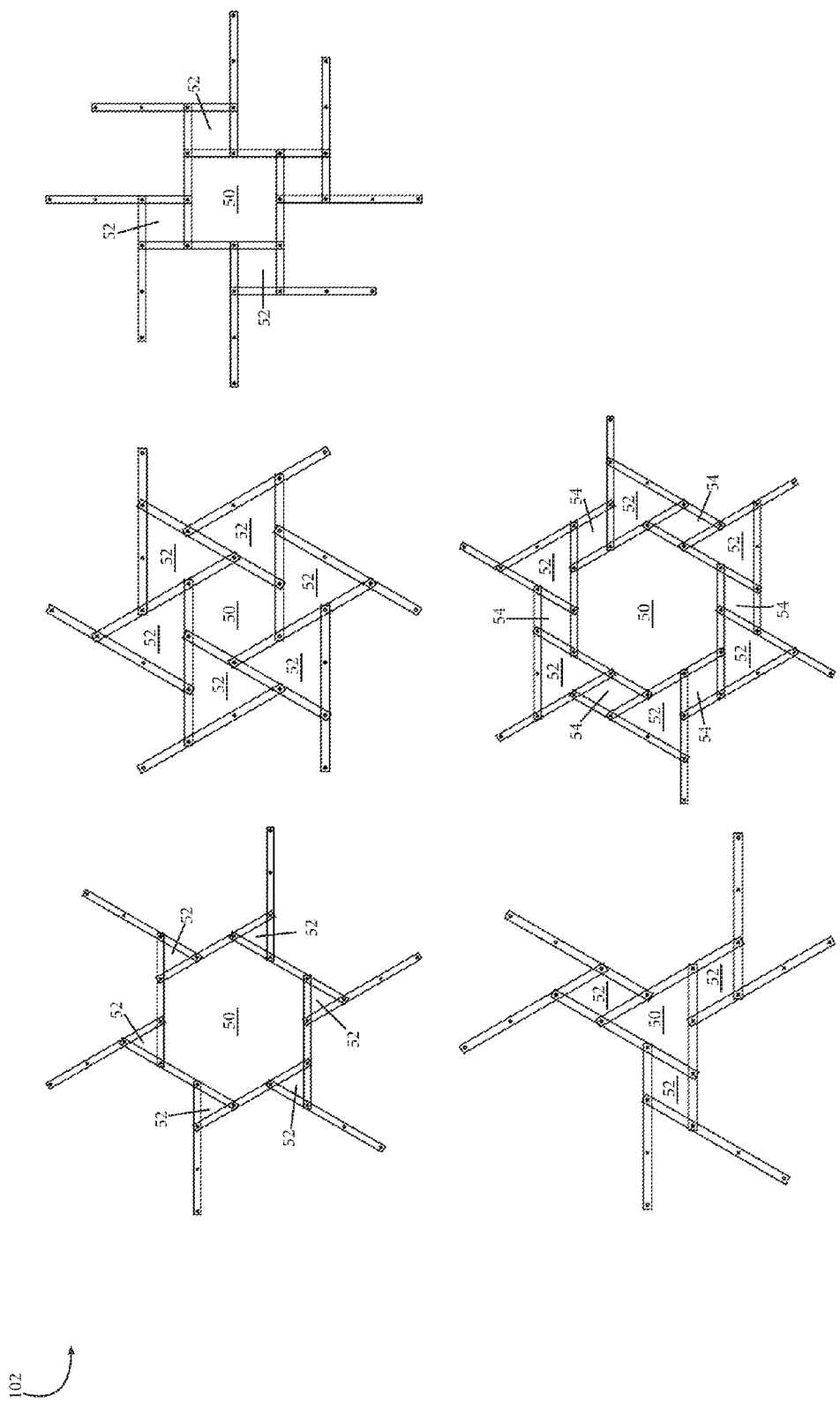

As shown in FIG. 15C, combinations of base structural units are also employable, whereby interrelated geometric relationships are considered that define hybrid base structural units 102 having more than one attractor polygon. In the example hybrid base structural units 102 depicted in FIG. 15C, a primary attractor polygon 50 is formed covalent a secondary attractor polygon 52 and, in some instances, also a tertiary attractor polygon 54. Thus interrelated geometric polygons comprising interlapped elongate members are intended to enable formation of regular and irregular self-supporting polyhedra.

Figure 9:
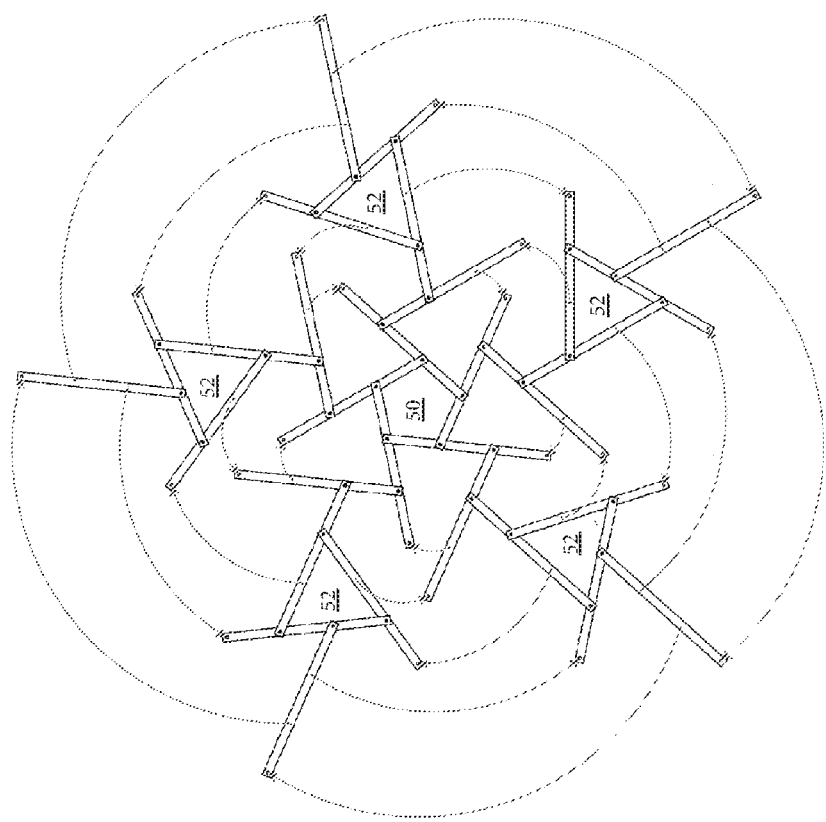
FIG. 9 is a top view of an example embodiment of a complex structure formable by interlapped configuration of elongate members around triangular attractor polygons and pentagonal pentagons.
Figure 10:
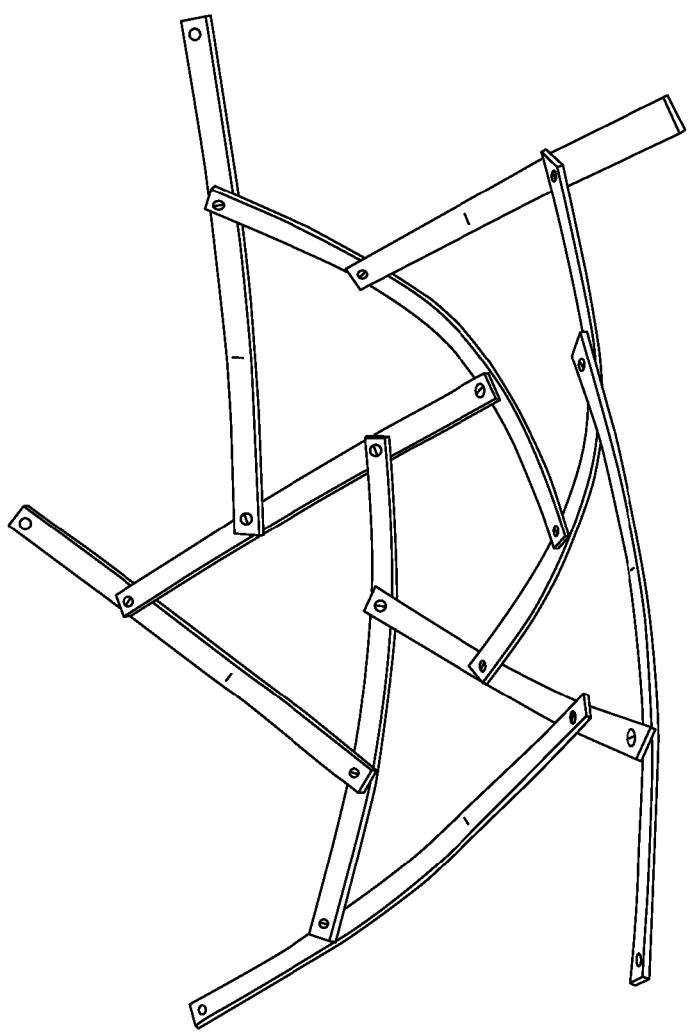
FIGS. 10 through 14 depict an example of steps required to create a tensegrity structure formed as a sphere having triangular and pentagonal attractor polygons.
Figure 11:
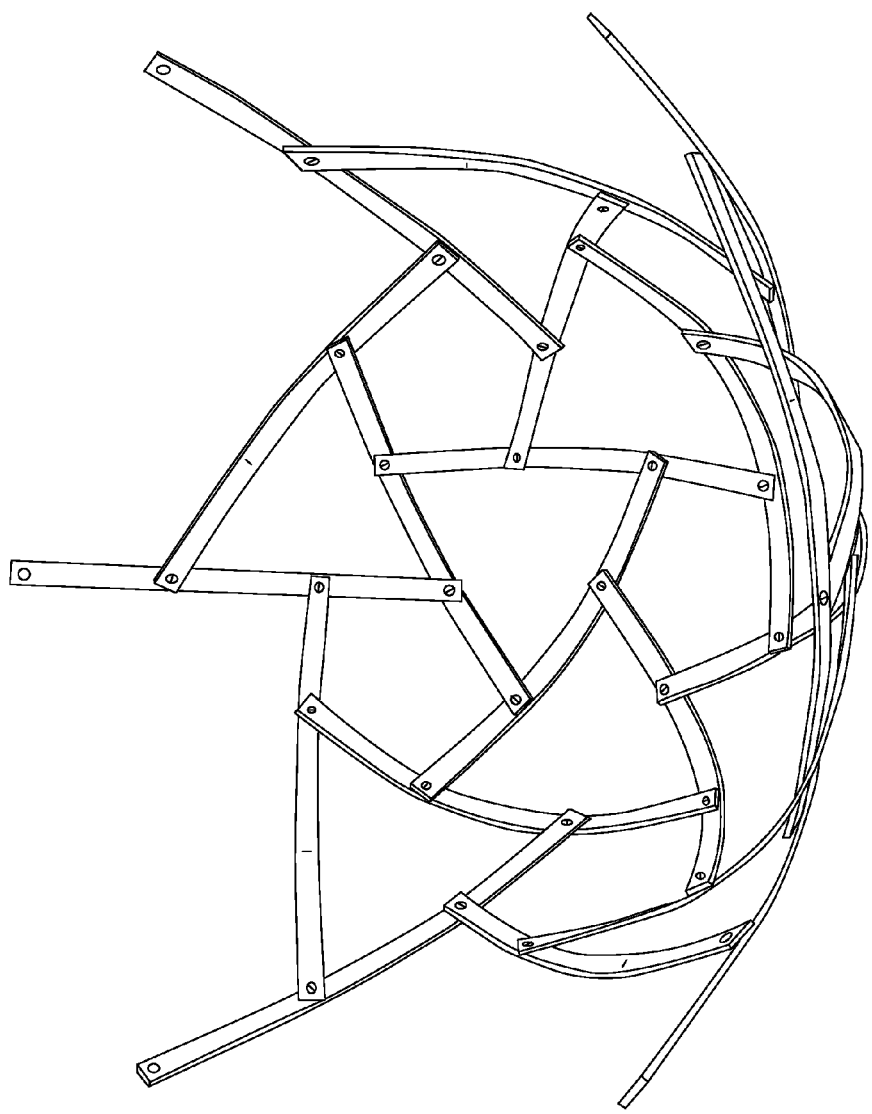
Figure 12:
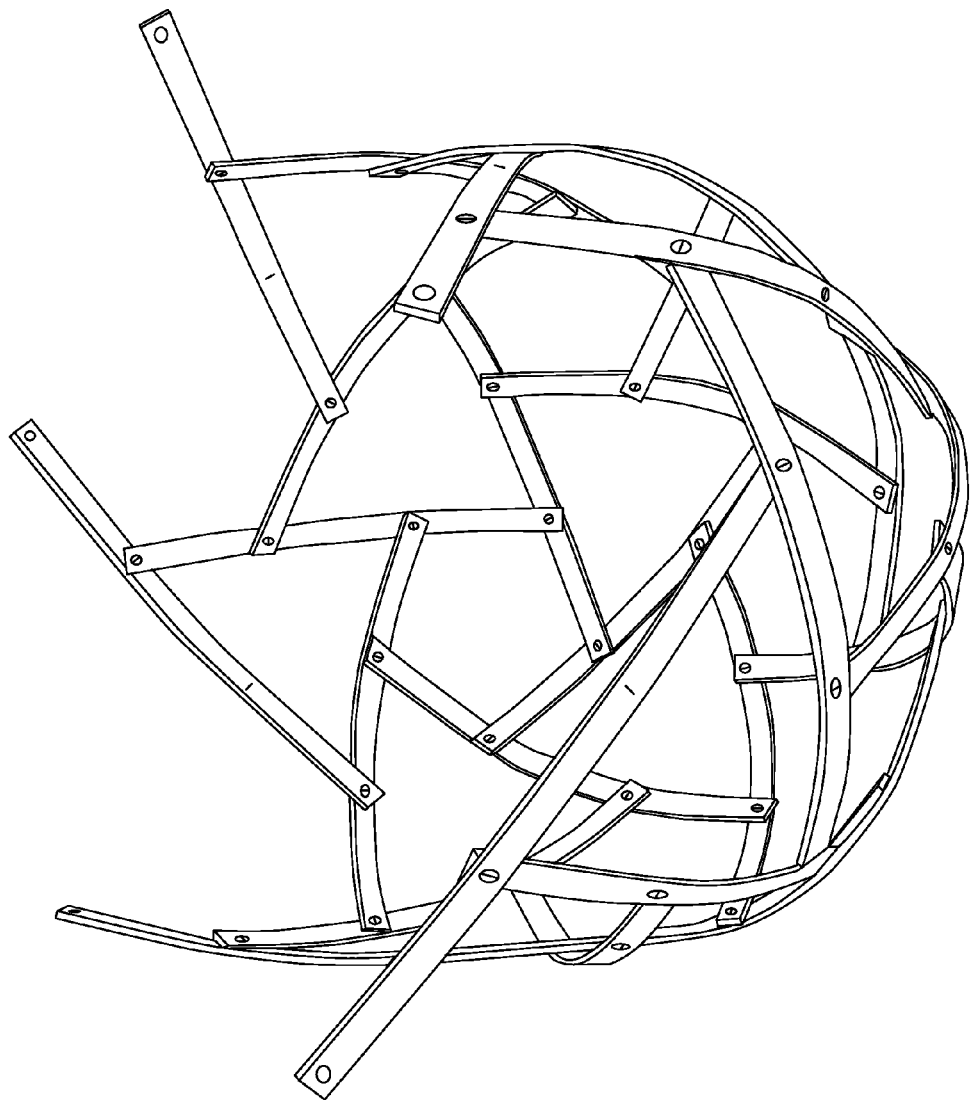
Figure 13:
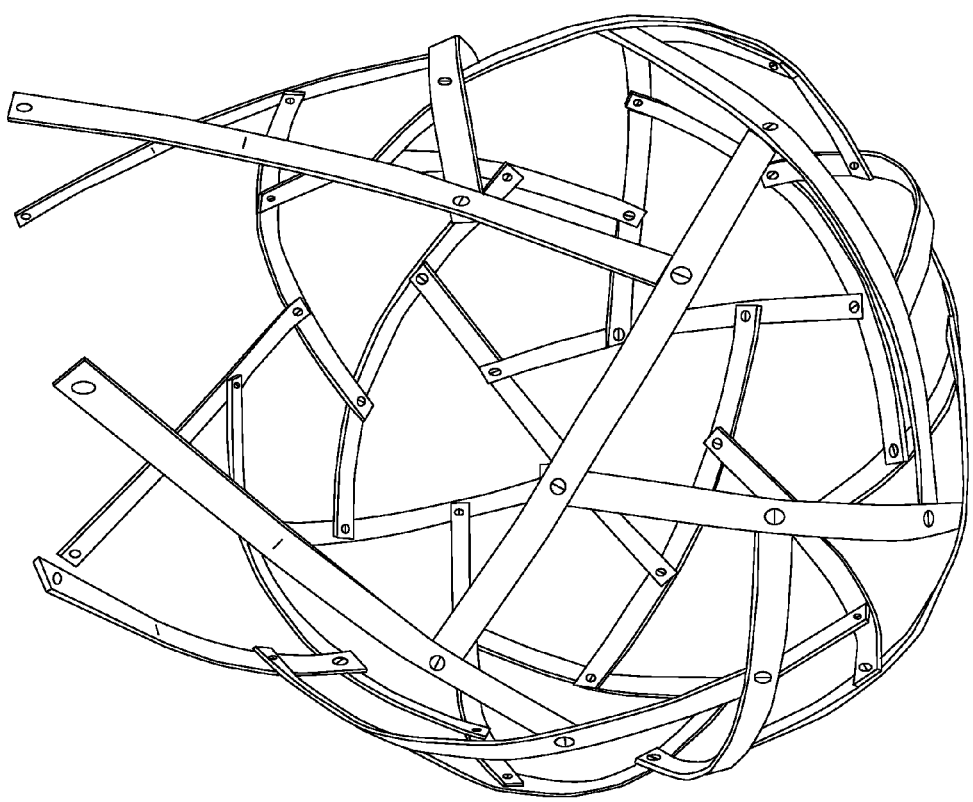
Figure 14:
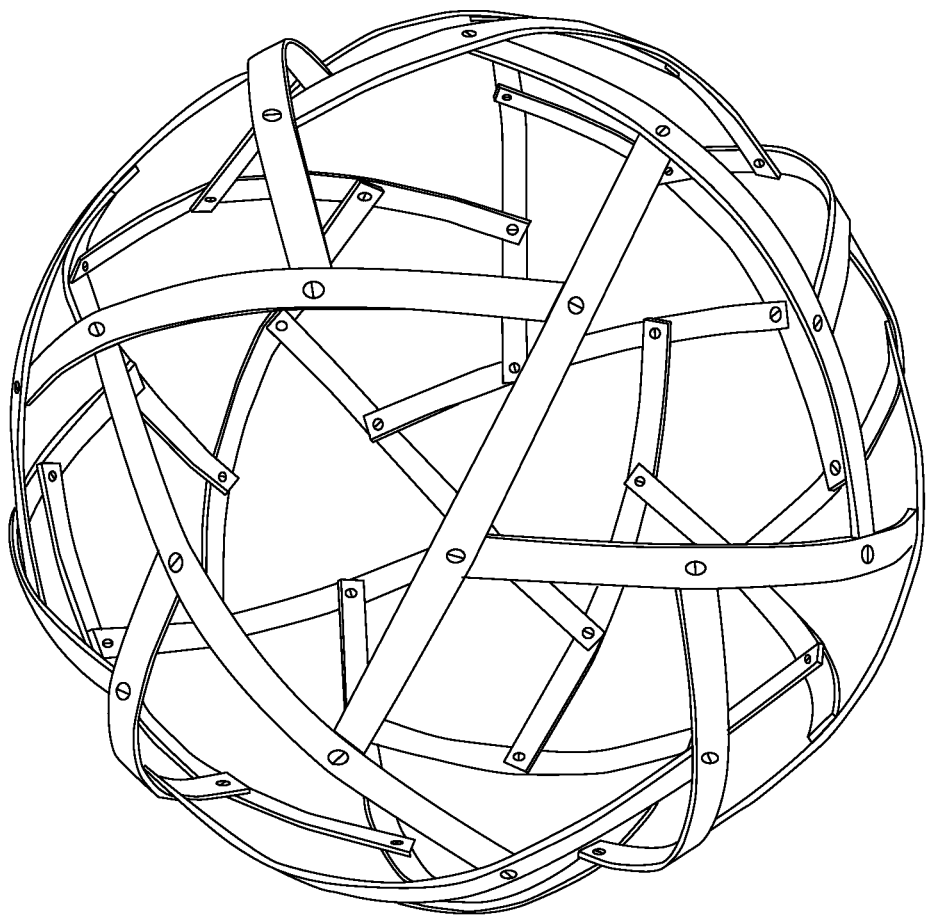

FIG. 9 illustrates means of assembling an example embodiment of the invention 10. An example base structural unit 100 employs hybrid attractor polygons in geometric arrangement wherein a primary attractor polygon 50 (in this example, a pentagon) yields, due to the interlapping disposition of the elongate members 20, a secondary attractor polygon 52 (in this example, a triangle).

FIGS. 10 through 14 illustrate assembly of a spherical self-supporting structure devised of the hybrid base structural unit 100 comprising pentagonal primary attractor polygons and triangular secondary attractor polygons. A domic structure is readily determinable by creating a hemispherical structure and thence anchoring open ends of elongate members to a ground or other surface.

Polyhedral and domic structures are thus creatable with numerous configurations wherein interlap of elongate members 20 is effected at each elongate member 20 first and second end 22, 24, with at least three elongate members together in geometric arrays formative of polyhedrons.

Additional complexity is enabled by incorporation of tertiary attractor polygons 54 formable between secondary and primary attractor polygons (see for example FIG. 15C). Position of each medial interconnection member 30, 32 may also be variable along the length of each elongate member 20, by which size and regularity (or irregularity) of associated attractor polygons is likewise variable. Thus, in addition to regular polyhedrons, Waterman polyhedrons are also creatable by use of the present tension compression structural unit 10.

Moreover, situating at least one of the first and second medial interconnection members on opposing sides of an elongate member enables transitions between species of polyhedrons and the creation of composite polyhedrons, connected by dissimilar structural units, is thus enabled.

A great variety of self-supporting tensegrity structures are thus envisioned as creatable by employment of the present invention.

What is claimed is:

1. A tension compression structural unit comprising a plurality of elongate members disposed in interlapping endwise configuration to exert forces of tension and compression upon each other and thereby maintain structural integrity, said plurality of elongate members comprising:
    at least a first elongate member, a second elongate member, and a third elongate member, each of said first, second, and third elongate member having:
    a first end;
    a second end;
    a first seat disposed at the first end;
    a second seat disposed at the second end;
    a first medial interconnection member disposed medially upon the elongate member more proximal the first end; and
    a second medial interconnection member disposed medially upon the elongate member more proximal the second end;
    wherein each of said plurality of elongate members is interlapped by interposition of the first seat of said first elongate member at the first medial interconnection member of the second elongate member, which first elongate member first medial interconnection member is likewise retained by the first seat of at least the third elongate member, which third elongate member first medial interconnection member is likewise retained by the first seat of the second elongate member in interlapping configuration, whereby the first end of each of the at least first, second, and third elongate members underlaps one of the other two elongate members and overlaps the other of the two other elongate members and the structural unit is stabilized and maintained by tension and compression exerted between each of the plurality of elongate members when disposed in like interlapped array, or otherwise anchored, at each second end.

2. The tension compression structural unit of claim 1 wherein the plurality of elongate members demark a primary attractor polygon delimited between the interlapped ends, whereby a completed polyhedral structure creatable by additional structural units interlapped together is dependent on, and identifiable by, the primary attractor polygon.

3. The tension compression structural unit of claim 2 wherein a plurality of said structural units creates a polyhedron.

4. The tension compression structural unit of claim 3 wherein at least one additional attractor polygon is formable in geometric relationship to the primary attractor polygon of each structural unit, whereby additional species of polyhedrons are creatable by interlapped elongate members disposed bounding at least two species of attractor polygons, said two species of attractor polygons having a different number of sides.

5. A method of assembling structures using at least a single structural unit in repeating patterned array to create a spanning polyhedron having an open understory, said method comprising the steps of:
    tensioning at least three flexible, elastic elongate members in interlapped configuration at a first end of each of said at least three elongate members; and
    anchoring a second end of each of the at least three elongate members;
    wherein tensegrity occurs at the interlapped first ends of each of the at least three elongate members by means of the elastic forces of each of the at least three elongate members tensioning and compressing against each other at each first end, whereby stability of the at least three elongate members is enabled without the need of any additional tensioning elements required, and addition of additional such structural units at each second end of each of the at least three elongate members enables assemblage of a large polyhedron having an open understory.

* * * * *